(12) United States Patent
Kawamura

(10) Patent No.: US 7,286,165 B2
(45) Date of Patent: Oct. 23, 2007

(54) IMAGE PICKUP APPARATUS WITH A VARIABLE LENGTH ENCODER AND DATA QUANTITY MONITOR

(75) Inventor: Yuji Kawamura, Chiba (JP)

(73) Assignee: Sony Corporation, Tokyo (JP)

( * ) Notice: Subject to any disclaimer, the term of this patent is extended or adjusted under 35 U.S.C. 154(b) by 860 days.

(21) Appl. No.: 10/415,114

(22) PCT Filed: Aug. 16, 2002

(86) PCT No.: PCT/JP02/08326

§ 371 (c)(1),
(2), (4) Date: Apr. 24, 2003

(87) PCT Pub. No.: WO03/021955

PCT Pub. Date: Mar. 13, 2003

(65) Prior Publication Data

US 2004/0027463 A1    Feb. 12, 2004

(30) Foreign Application Priority Data

Aug. 28, 2001   (JP)   ............................. 2001-258426

(51) Int. Cl.
*H04N 5/228*    (2006.01)
*H04N 7/12*     (2006.01)
(52) U.S. Cl. ................. 348/222.1; 348/390.1
(58) Field of Classification Search ............. 348/222.1, 348/390.1, 231.99; 382/251, 239
See application file for complete search history.

(56) References Cited

U.S. PATENT DOCUMENTS

| | | | | |
|---|---|---|---|---|
| 5,295,077 A | * | 3/1994 | Fukuoka | ............ 358/479 |
| 5,440,404 A | * | 8/1995 | Okamoto | ............ 382/246 |
| 5,661,523 A | * | 8/1997 | Yamane | ............ 348/390.1 |
| 5,724,097 A | * | 3/1998 | Hibi et al. | ............ 375/240.04 |
| 6,081,211 A | * | 6/2000 | de Queiroz et al. | ............ 341/65 |
| 6,198,848 B1 | * | 3/2001 | Honma et al. | ............ 382/232 |
| 6,915,014 B1 | * | 7/2005 | Honma et al. | ............ 382/239 |

FOREIGN PATENT DOCUMENTS

| | | |
|---|---|---|
| JP | 4-145781 | 5/1992 |
| JP | 2000-125255 | 4/2000 |
| JP | 2001-238179 | 8/2001 |

* cited by examiner

*Primary Examiner*—Vivek Srivastava
*Assistant Examiner*—James M. Hannett
(74) *Attorney, Agent, or Firm*—Frommer Lawrence & Haug LLP; William S. Frommer

(57) ABSTRACT

This invention is a digital still camera having a coded data quantity monitoring circuit (9). This monitoring circuit (9) detects the quantity of data of an image signal compressed by a JPEG compression circuit (7). When a CPU (10) judges that the quantity of data detected by the coded data quantity monitoring circuit (9) is equal to or more than a maximum coded data quantity S, first, an image pickup element (3) is caused to pick up an image of an object again and output a different image signal, and a quantization table to be used in a quantization circuit (21) is changed. Next, the different image data is compressed by being DCT-transformed by a DCT circuit (20), then quantized by the quantization circuit (21) and coded by a coding circuit (22). The compressed different image signal is recorded to a memory card (13). In this case, the different image signal is recorded into an area where an image signal has been recorded in advance on the memory card (13).

5 Claims, 6 Drawing Sheets

IMAGE PICKUP APPARATUS WITH A VARIABLE LENGTH ENCODER AND DATA QUANTITY MONITOR

TECHNICAL FIELD

This invention relates to an image pickup apparatus such as a digital still camera and an image pickup method for recording an image signal obtained by picking up an image of an object to a recording medium.

BACKGROUND ART

Conventionally, an image pickup apparatus commercialized for consumer such as a digital still camera records an image signal to an attachable/removable external recording medium such as a memory card.

When recording an image signal to a recording medium, a digital still camera reduces the quantity of data by compressing the image signal and thus can record more image signals to one recording medium. In the digital still camera of this type, an image signal is compressed in conformity with a standard called JPEG (Joint Photographic Expert Group).

In compression of an image signal carried out in conformity with JPEG, discrete cosine transform (hereinafter referred to as DCT) processing is first performed to the image signal. Next, the image signal is quantized on the basis of a quantization table, which is a matrix table of quantization characteristic values in consideration of statistical characteristics and human auditory characteristics. Then, the quantized image signal is coded. As the coding, entropy coding is mainly performed.

This entropy coding is variable-length coding. The quantity of data after compressing an image signal of one frame is not constant but largely changes depending on the pattern of the image. That is, when an image signal is compressed in conformity with JPEG, the compression rate of an image signal of one frame largely changes depending on the pattern of the image. Therefore, when recording an image signal picked up by a digital still camera to a recording medium, the size of a region to be recorded changes depending on the image and it is difficult to guarantee a lower limit of the number of frames of images that can be recorded on one recording medium.

As a method for guaranteeing a lower limit of the number of frames of images that can be recorded on one recording medium, the compression rate may be controlled when the digital still camera compresses an image signal. Digital still cameras that can control the compression rate of an image signal may be, for example, a digital still camera disclosed in the Japanese Patent Laid-Open Publication No.H5-64143, a digital still camera disclosed in the Japanese Patent Laid-Open Application No.H9-326994 and the like.

Hereinafter, the digital still camera disclosed in the Japanese Patent Laid-Open Publication No.H5-64143 will be described. A digital still camera 100 disclosed in this publication has a lens 101, an image pickup element 102, a signal processing unit 103, a frame memory 104, a DCT circuit 105, a quantization circuit 106, a coding circuit 107, an interface 108, an activity calculation circuit 109, a coefficient addition/subtraction circuit 110, a quantization table 111, a bit allocation circuit 112, a counter circuit 113, an error detection circuit 114, a register 115, a comparison circuit 116, and a judgment circuit 117, as shown in FIG. 1. On the digital still camera 100, a memory card 118, which is a recording medium attachable to and removable from the digital still camera 100, is mounted.

In the digital still camera 100, first, incident light from an object that is made incident via the lens 101 forms an image on an image pickup surface of the image pickup element 102. The image formed on the image pickup surface is converted to an electric signal by the image pickup element 102. The image signal converted to the electric signal is supplied to the signal processing unit 103. The image signal is converted to a digital signal as color processing and analog/digital (A/D) conversions are performed in the signal processing unit 103. The image signal of one frame, which is now a digital signal, is temporarily recorded to the frame memory 104.

Next, the frame memory 104 divides the temporarily recorded image signal of one frame into, for example, blocks each consisting of 8×8 pixels, and supplies each block to the DCT circuit 105. The frame memory 104 supplies the temporarily recorded image signal of one frame twice in order to compress the image signal after deciding a necessary parameter for a series of compression coding processing, and further supplies the image signal of one frame at least once in order to control the compression rate of image data.

The image signal supplied for the first time from the frame memory 104 is DCT-transformed by the DCT circuit 105 and then supplied to the activity calculation circuit 109. The activity calculation circuit 109 finds the total quantity of activity of one image frame on the basis of the image signal supplied from the DCT circuit 105. The bit allocation circuit 112 decides bit allocation to luminance and color signals and finds a coefficient a.

The image signal supplied for the second time from the frame memory 104 is DCT-transformed by the DCT circuit 105 and then supplied to the quantization circuit 106, where quantization is performed in accordance with a quantization step calculated by arithmetic processing of the previously found coefficient a and data of the quantization table 111. In this case, the coefficient addition/subtraction circuit 110 does not perform arithmetic processing with respect to the coefficient a. Moreover, the image signal supplied for the second time from the frame memory 104 is DCT-transformed by the DCT circuit 105 and then supplied also to the activity calculation circuit 109. The activity calculation circuit 109 sequentially finds the quantity of activity of each block on the basis of the image signal supplied for the second time from the frame memory 104 and DCT-transformed by the DCT circuit 105, and finds ultimate bit allocation for each block based on the bit allocation decided in the first supply.

Next, the coding circuit 107 adjusts the quantity of coding bits in accordance with the bit allocation decided by the activity calculation circuit 109 and performs coding of the image signal supplied from the DCT circuit 105. The coded image signal (referred to as CMD1) is recorded to the memory card 118 via the interface 108, and at the same time, the quantity of data is measured by the counter circuit 113. The error detection circuit 114 detects the difference (referred to as DE1) between a predetermined value (i.e., maximum quantity of coded data of one frame of the image signal that can be recorded to the memory card 118, hereinafter referred to as maximum coded data quantity) and CMD1, and temporarily sets the difference to the register 115.

Next, the judgment circuit 117 judges whether compression processing should be performed again to the image signal on the basis of DE1 to control the compression rate or not. When the judgment circuit 117 judges that compression processing should be performed again to the image signal, it requests the frame memory 104 to supply the image signal for the third time. The digital still camera 100 performs compression processing to the image signal supplied for the third time from the frame memory 104.

However, when performing compression processing to the image signal outputted for the third time from the frame memory 104, the value of the coefficient a is changed by the coefficient addition/subtraction circuit 110. The magnitude of change and switching between addition and subtraction with respect to the coefficient a are decided and controlled by the judgement circuit 117 in accordance with the quantity of errors and the polarity. The polarity represents the relation between the quantity of data recorded on the memory card 118 and the maximum coded data quantity. When the quantity of data recorded on the memory card 118 is less than the maximum coded data quantity, the polarity is positive. When the quantity of data recorded on the memory card 118 is equal to or larger than the maximum coded data quantity, the polarity is negative.

The image signal (referred to as CMD2), quantized on the basis of the different coefficient a and then coded, is newly recorded to the memory card 118. When recording CMD2 to the memory card 118, a different area (referred to as MA2) from the area (referred to as MA1) where CMD1 is recorded is used. At the same time when CMD2 is recorded to the memory card 118, the counter circuit 113 measures the quantity of data of CMD2. Moreover, the error detection circuit 114 detects the difference (referred to as DE2) between a predetermined value and CMD2 and temporarily sets the difference to the register 115.

Then, the comparison circuit 116 compares DE1 with DE2 and selects a value that is smaller and has positive polarity. The judgment circuit 117 judges whether to perform compression processing again to the image signal to control the compression rate, on the basis of the difference value selected by the comparison circuit.

As described above, in the digital still camera 100 shown in FIG. 1, the compression rate is controlled by repeating compression processing to the image signal four, five, six, . . . times while changing the value of the coefficient a. Ultimately, in the digital still camera 100, an image signal having a data quantity more close to a desired value and having positive polarity is recorded to the memory card 118.

On the other hand, in the digital still camera disclosed in the Japanese Patent Laid-Open Application No.H9-326994, when a recordable area on a recording medium is equal to or less than a predetermined area, the compression rate is controlled by repeating compression processing of an image signal plural times while changing the value of a coefficient a, and an image signal having a data quantity closer to a desired value and having positive polarity is saved to the recording medium. In this digital still camera, as the compression rate of an image signal is controlled only when a recordable area on a recording medium is equal to or less than a predetermined area, it is possible to reduce the time for performing compression processing to the image signal and restrain the power consumption.

Meanwhile, provision of a low-cost digital still camera has been recently demanded. As a method for lowering the cost of a digital still camera, a necessary memory capacity for processing an image signal may be minimized without providing a frame memory. When no frame memory is provided, a digital still camera performs real-time compression processing to an image signal outputted from an image pickup element.

In the digital still camera having no frame memory, an image signal of one frame before compression processing cannot be temporarily recorded. In the digital still camera of this type, unlike the digital still camera 100 disclosed in the Japanese Patent Laid-Open Publication No.H5-64143, it is impossible to control the compression rate of an image signal by requesting the frame memory 104 to supply, plural times, an image signal before compression processing and performing compression processing plural times while changing the coefficient a.

DISCLOSURE OF THE INVENTION

It is an object of the present invention to provide a new image pickup apparatus and image pickup method that can overcome the problems of the conventional apparatuses as described above.

It is another object of the present invention to provide an image pickup apparatus and an image pickup method that enables control of the compression rate even when a necessary memory capacity for processing an image signal is minimized.

An image pickup apparatus according to the present invention includes: image pickup means for converting an object image to an image signal and outputting the image signal; orthogonal transform means for orthogonally transforming the image signal; plural quantization tables having different quantization characteristic values; quantization means for quantizing the image signal orthogonally transformed by the orthogonal transform means, using the quantization tables; coding means for performing variable-length coding to the image signal quantized by the quantization means; recording control means for recording the image signal variable-length-coded by the coding means, to an external recording medium; data quantity detection means for detecting the quantity of data of the image signal variable-length-coded by the coding means; switching control means for controlling switching between a first mode for outputting the image signal once when the image pickup means performs an image pickup operation once and a second mode for outputting the image signal plural times when the image pickup means performs an image pickup operation once; and output control means for, when in the second mode, judging whether or not the quantity of data of the image data detected by the data quantity detection means is equal to or more than a predetermined value, and causing the image pickup means to output the image signal again when the data quantity is equal to or more than the predetermined value. In this image pickup apparatus, when in the second mode, the quantization means quantizes the image signal supplied from the orthogonal transform means, using a different quantization table every time when the output control means causes the image pickup means to output the image signal.

The recording control means in the image pickup apparatus according to the present invention, when in the second mode, records the image signal supplied from the coding means for the m-th time (m being an integer equal to or more than 2) to an area where the image signal supplied from the coding means for the (m−1)th time is recorded.

An image pickup method according to the present invention includes: an orthogonal transform step of orthogonally transforming an image signal outputted by an image pickup element; a quantization step of quantizing the image signal orthogonally transformed at the orthogonal transform step, using a quantization table; a coding step of performing variable-length coding to the image signal quantized at the quantization step; a recording step of recording the image signal variable-length-coded at the coding step, to an external recording medium; a data quantity detection step of detecting the quantity of data of the image signal variable-length-coded at the coding step; and image signal re-outputting step of judging whether or not the quantity of data of the image data detected at the data quantity detection step is equal to or more than a predetermined value, and causing the image pickup element to output the image signal again when it is judged that the quantity of data is equal to or more than the predetermined value; wherein at the quantization step, the image signal is quantized using a different quantization table every time when the image signal is outputted at the image signal re-outputting step.

The other objects of the present invention and specific advantages provided by the present invention will be further clarified by the following description of an embodiment referring to the drawings.

BEST MODE FOR CARRYING OUT THE INVENTION

A digital still camera to which the present invention is applied will now be described in detail with reference to FIGS. 2 to 6.

Figure 1:
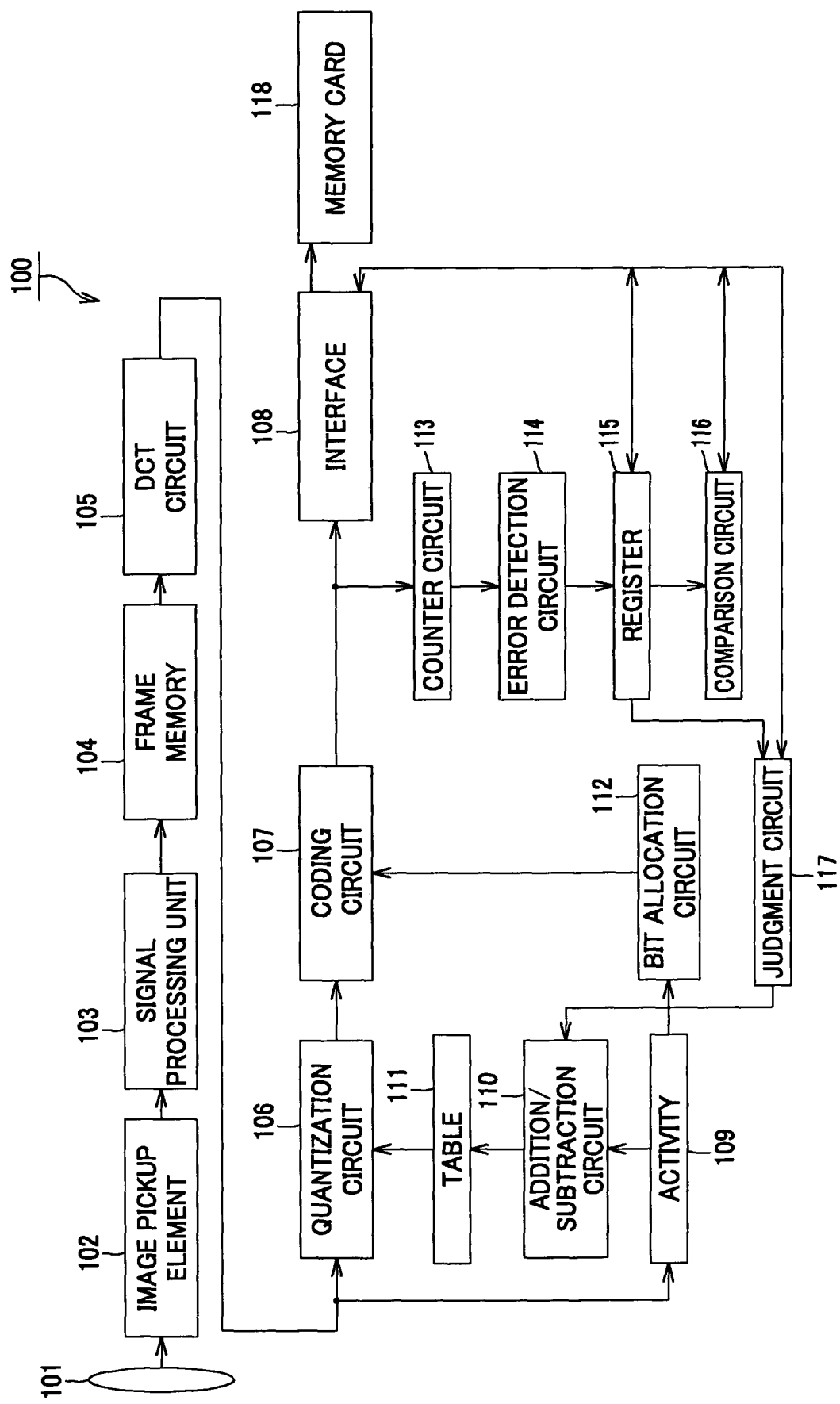
FIG. 1 is a block diagram showing a conventional digital still camera.
Figure 2:
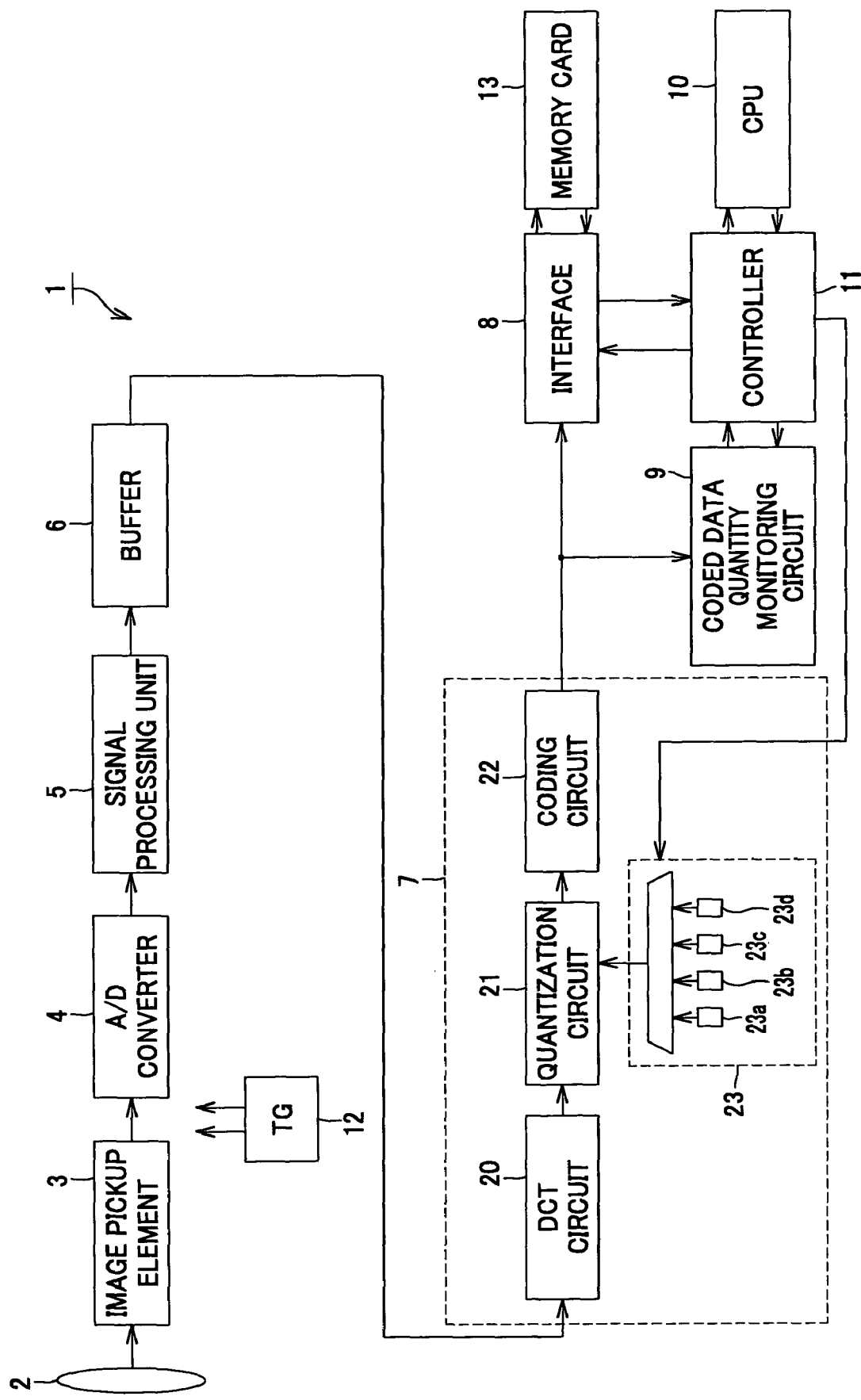
FIG. 2 is a block diagram showing a digital still camera to which the present invention is applied.

A digital still camera 1 to which the present invention is applied has a lens 2, an image pickup element 3, an analog/digital converter (hereinafter referred to as A/D converter) 4, a signal processing unit 5, a buffer 6, a JPEG unit 7, an interface 8, a coded data quantity monitoring circuit 9, a central processing unit (hereinafter referred to as CPU) 10, a controller 11, and a timing generator 12, as shown in FIG. 2. On the digital still camera 1 shown in FIG. 2, a memory card 13 as an attachable/removable recording medium is mounted.

The lens 2 concentrates incident light from an object to form image on an image pickup surface of the image pickup element 3.

The image pickup element 3 is a semiconductor element for picking up an image of the object. The image pickup element 3 converts the image formed on the image pickup surface to an electric signal and outputs the electric signal as an image signal. As the image pickup element 3, for example, CCD (charge-coupled device) or CMOS (complementary metal-oxide semiconductor device) is used. The image signal outputted from the image pickup element 3 is an analog signal.

The A/D converter 4 converts the image signal outputted from the image pickup element 3, from an analog signal to a digital signal.

The signal processing unit 5 performs color processing to the image signal. For example, the signal processing unit 5 converts the image signal outputted from the A/D converter 4 to a set of image signals including a luminance signal Y and a pair of color-difference signals R-Y, B-Y.

The buffer 6 outputs the image signals supplied from the signal processing unit 5, in a predetermined order, and thus supplies the image signals to the JPEG unit 7. In this case, an image signal of one frame is divided into blocks each consisting of, for example, 8×8 pixels, and data is outputted by block.

The JPEG unit 7 has a discrete cosine transform circuit (hereinafter referred to as DCT circuit) 20, a quantization circuit 21, a coding circuit 22, and first to fourth quantization tables 23a to 23d. The JPEG unit 7 performs compression processing to the image signal supplied from the buffer 6, in accordance with the JPEG (Joint Photographic Expert Group) standard.

The interface 8 converts the image signal outputted from the JPEG circuit 7 to the format of the memory card 13 and supplies the image signal to the memory card 13.

The coded data quantity monitoring circuit 9 detects the quantity of data of the image signal compressed by the JPEG unit 7 and supplies the detected quantity of data to the CPU 10 via the controller 11.

The CPU 10 performs control of the whole processing of the image signal. The CPU 10 also decides whether to control the compression rate of the image signal or not, on the basis of the image size, the setting of an image quality parameter, the recording capacity of the memory card 13 and the like. When the CPU 10 decides to control the compression rate of the image signal, the CPU 10 sets the digital still camera 1 in a continuous image pickup compression control mode, then decides a maximum data quantity (maximum coded data quantity for one frame of image signal that can be recorded to the memory card 13) S and the number of continuously picked-up images N, and sets the frame number at 1. The CPU 10 also decides a quantization table $\alpha i$ to be used in the quantization circuit 21, from the first to fourth quantization tables 23a to 23d. Moreover, when in the continuous image pickup compression control mode, the CPU 10 compares the quantity of data detected by the coded data quantity monitoring circuit 9 with the maximum coded data quantity S and decides whether to perform compression processing again to the image signal. Specifically, when the image signal outputted from the JPEG circuit 7 exceeds the maximum coded data quantity S, the CPU 10 decides to perform compression processing again to the image signal. When it is judged that the image signal outputted from the JPEG circuit 7 is less than the maximum coded data quantity S, the CPU 10 decides not to perform compression processing to the image signal. When performing compression processing again to the image signal, the CPU 10 newly selects the quantization table $\alpha i$ to be used in the quantization circuit 21 from the first to fourth quantization tables 23a to 23d, increments the frame number i, and requests the image pickup element 3 to pick up an image of the object again.

The controller 11 supplies the signal supplied from the coded data quantity monitoring circuit 9 to the CPU 10. The controller 11 also supplies the signal supplied from the CPU 10 to the coded data quantity monitoring circuit 9 and a quantization table unit 23.

The timing generator 12 supplies a vertical synchronizing signal. The operation of the digital still camera 1 is switched synchronously with the vertical synchronizing signal supplied from this timing generator 12. For example, an increment of the frame number i and a change of the quantization table αi are carried out synchronously with this vertical synchronizing signal.

The JPEG unit 7 will now be described in detail. The JPEG unit 7 has the DCT circuit 20, the quantization circuit 21, the coding circuit 22, and the quantization table unit 23.

The DCT circuit 20 performs two-dimensional DCT transform to the image signal supplied from the buffer 6. Specifically, the DCT circuit 20 performs two-dimensional DCT transform of a block divided into, for example, 8×8 pixels, thereby transforming the data of 8×8 (=64) pixels to 8×8 (=64) DCT coefficients.

The quantization circuit 21 quantizes the 64 DCT coefficients supplied from the DCT circuit 20, using one of the first to fourth quantization tables 23a to 23d, which will be described later. Specifically, the quantization circuit 21 performs an arithmetic operation to perform quantization based on quantization characteristic values defined by the first to fourth quantization tables 23a to 23d, thus acquiring the quantized values of the 64 DCT coefficients. The quantization characteristic value is used as a denominator of division. Therefore, the smaller the quantization characteristic value is, the larger the quantity of image information is. That is, the image quality is higher.

The coding circuit 22 performs coding such as Huffman coding to the quantized values supplied from the quantization circuit 21 so that an average code length is reduced.

The quantization table unit 23 has the first to fourth quantization tables 23a to 23d. When the quantization circuit 21 performs quantization using different quantization tables of the first to fourth quantization tables 23a to 23d, the compression rate of the image signal in the JPEG circuit 7 changes. The quantization table αi used in the quantization circuit 21 is decided from the first to fourth quantization tables 23a to 23d in accordance with the judgment by the CPU 10.

The first to fourth quantization tables 23a to 23d are matrix tables of quantization characteristic values in consideration of statistical characteristics and human auditory characteristics. The first to fourth quantization tables 23a to 23d are used when the quantization circuit 21 performs quantization. Specifically, each of these tables shows 8×8 (=64) quantization characteristic values.

While the first to fourth quantization tables 23a to 23d are provided in the digital still camera 1 shown in FIG. 2, any plural number of quantization tables may be provided in the digital still camera according to the present invention. It is preferred that a larger number of quantization tables are provided in the digital still camera to which the present invention is applied. The more quantization tables are provided, the more precisely the digital still camera can adjust the compression rate.

The operation of the digital still camera 1 will now be described with reference to FIGS. 3 and 4.

Figure 3:
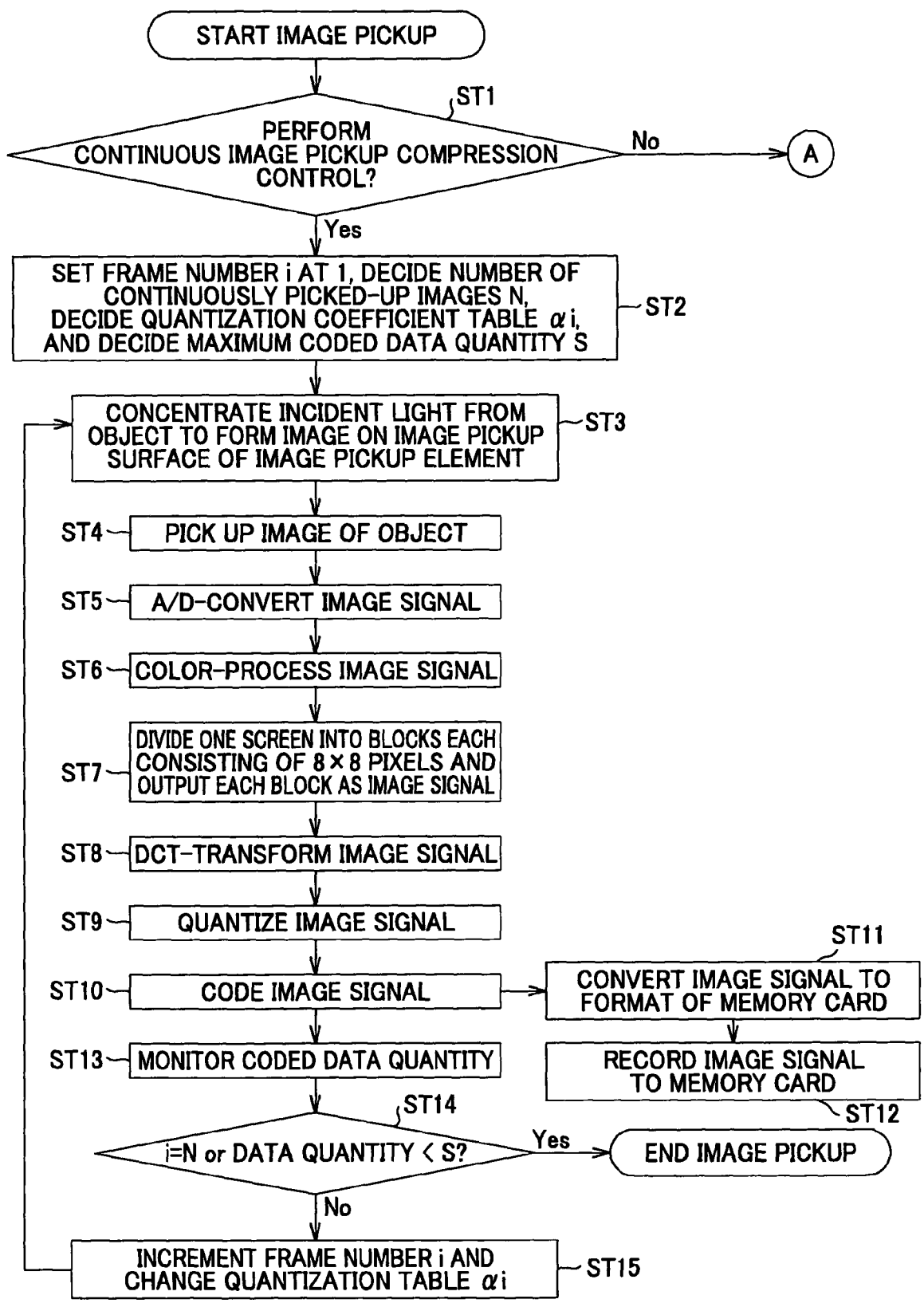
FIG. 3 is a flowchart showing the operation of the digital still camera in a continuous image pickup compression control mode.

First, as shown in FIG. 3, at step ST1, the CPU 10 decides whether to control the compression rate of the image signal or not, on the basis of the image size, the setting of an image quality parameter, the recording capacity of the memory card 13 and the like. When the CPU 10 decides to control the compression rate of the image signal, the processing goes to step ST2 and the digital still camera 1 enters the continuous image pickup compression control mode. When the CPU 10 decides not to control the compression rate of the image signal, the processing goes to step ST16 and the digital still camera 1 enters the one-frame image pickup mode. The operation of the digital still camera 1 in the one-frame image pickup mode will be described later.

At step ST2, the CPU 10 decides the maximum coded data quantity S and the number of continuously picked-up images N and sets the frame number i at 1. The CPU 10 also decides the quantization table αi to be used in the quantization circuit 21, from the first to fourth quantization tables 23a to 23d. The quantization table αi to be used in the quantization circuit 21 and the maximum coded data quantity S are decided experimentally on the basis of the image size and the like.

Next, at step ST3, the lens 2 concentrates incident light from the object to form an image on the image pickup surface of the image pickup element 3. At step ST4, the image of the object is picked up and the image formed on the image pickup surface is converted to an electric signal, which is then outputted.

Next, at step ST5, the image signal outputted from the image pickup element 3 is A/D-converted by the A/D converter 4. At step ST6, color processing is performed to the A/D-converted image signal by the signal processing unit 5. At step ST7, the buffer 6 divided one frame of the color-processed image signal into blocks each consisting of 8×8 pixels and outputs each block.

Next, at steps ST8 to ST10, compression processing of the image signal is performed in conformity with the JPEG standard. At step ST8, the DCT circuit performs two-dimensional DCT transform of the block divided into 8×8 pixels, thus transforming the data of 8×8 (=64) pixels to 8×8 (=64) DCT coefficients. At step ST9, the quantization circuit 21 quantizes the 64 DCT coefficients supplied from the DCT circuit 20, using the quantization table αi. At step ST10, the coding circuit 22 codes the quantized DCT coefficients.

At step ST11, the image signal coded at step ST10 is converted to the format of the memory card 13 by the interface 8. The image signal with the converted format is supplied to the memory card 13. At step ST12, the image signal is recorded onto the memory card 13.

Meanwhile, at step ST13, the quantity of data of the image signal coded at step ST10 is detected.

Next, at step ST14, the CPU 10 compares the quantity of data detected by the coded data quantity monitoring circuit 9 with the maximum coded data quantity S. The CPU 10 also compares the frame number i with the number of continuously picked-up images N. When the quantity of data detected by the coded data quantity monitoring circuit 9 is equal to or more than the maximum coded data quantity S, or when the frame number i is equal to the number of continuously picked-up images N, image pickup is ended. When the quantity of data detected by the coded data quantity monitoring circuit 9 is less than the maximum coded data quantity S and the frame number i is less tan the number of continuously picked-up images N, the processing goes to step ST15.

At step ST15, the CPU 10 increments the frame number i. In the quantization table unit 23, the quantization table αi to be used in the quantization circuit 21 is changed. The processing then goes back to step ST3. The image pickup element 3 is caused to pick up an image of the object again under the control of the CPU 10, and compression processing of the image signal is performed again. At step ST15, the CPU 10 selects a quantization table αi that realizes a higher compression rate, compared with the quantization table $\alpha i$ used at step ST9 before incrementing the frame number i. When the result of the increment of the frame number i is equal to the number of continuously picked-up images N, the CPU 10 must select a quantization table $\alpha i$ so that the quantity of data of an image signal coded in the next compression processing is less than the maximum coded data quantity S.

When the processing goes back to step ST3 to perform compression processing to the image signal again, the image signal is recorded again to the memory card 13 at step ST12. When recording the image signal again to the memory card 13, the image signal is to be recorded into the same area as the area where the image signal is recorded before incrementing i. Specifically, when recording to the memory card 13 an image signal coded by the coding circuit 22 for the m-th time (m being an integer equal to or more than 2) and converted to the format of the memory card 13 by the interface 8, the image signal is to be recorded into the area where an image signal coded by the coding circuit 22 for the (m−1)th time and converted to the format of the memory card 13 by the interface 8 is recorded. Therefore, in the digital still camera 1, the compression rate of the image signal can be controlled even when the memory card 13 has no excess recording capacity.

Figure 4:
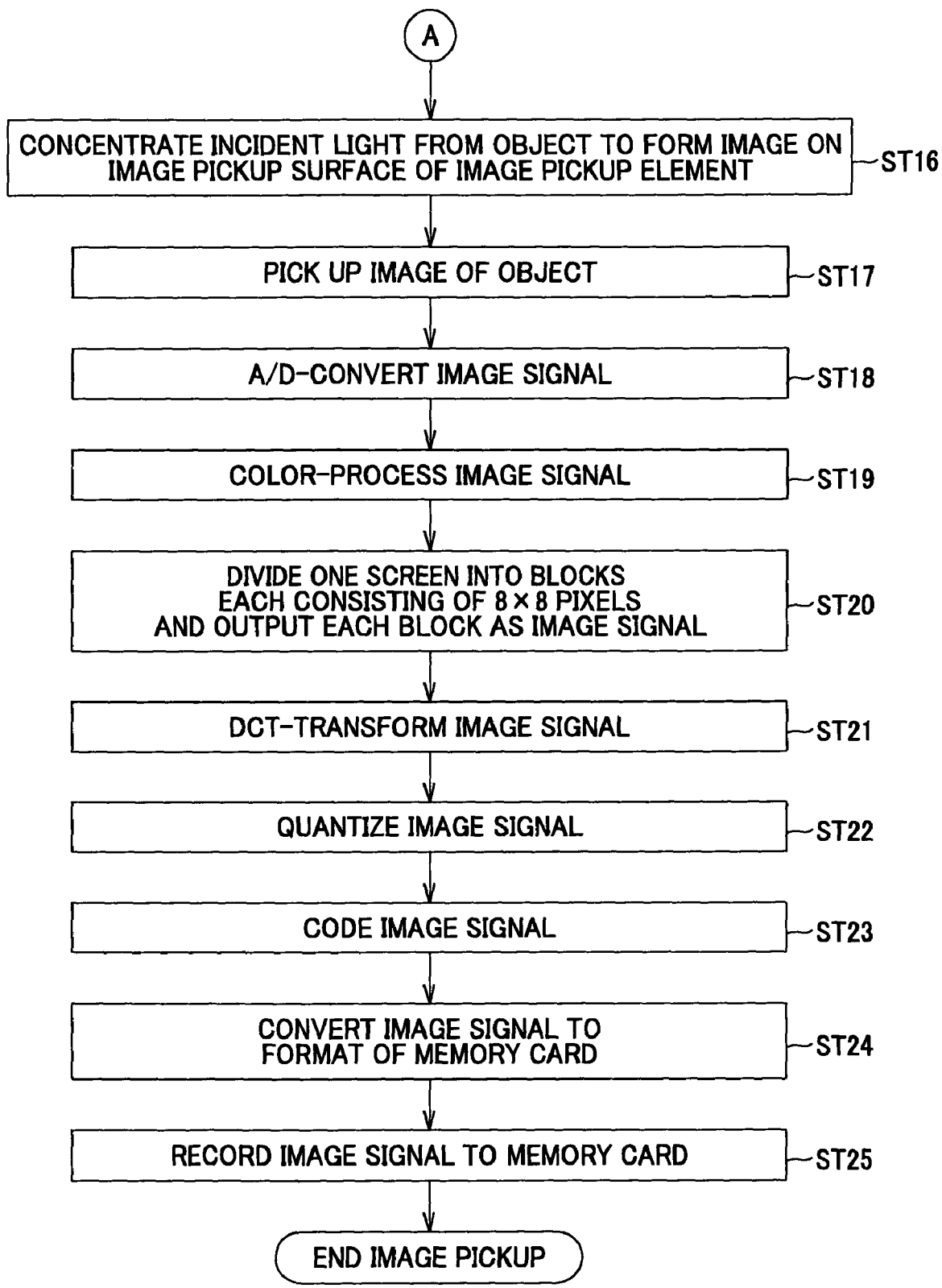
FIG. 4 is a flowchart showing the operation of the digital still camera in a one-frame image pickup mode.

The operation of the digital still camera 1 in the one-frame image pickup mode is as shown in FIG. 4. The operation of the digital still camera 1 at steps ST16 to ST24 is the same as the operation at steps ST3 to ST12 in the continuous image pickup compression control mode and therefore the description of steps ST3 to ST12 also applies here. After the image signal is recorded onto the memory card 13 at step ST24, the image pickup is ended without performing compression processing again.

Figure 5:
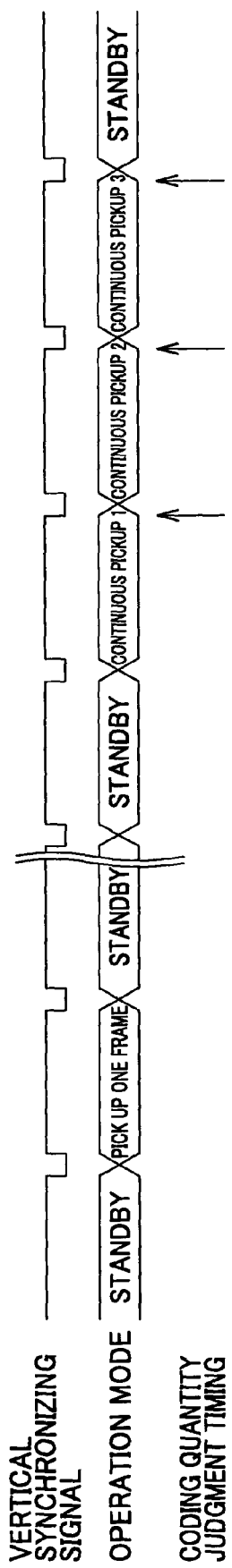
FIG. 5 is a timing chart showing timing when an image pickup element performs image pickup again in the continuous image pickup compression control mode in the digital still camera.

The operation of the digital still camera 1 is switched synchronously with the vertical synchronizing signal outputted from the timing generator 12, as shown in FIG. 5. For example, in the continuous image pickup compression control mode, the image pickup element 3 picks up an image of the object again and compression processing is performed, synchronously with the vertical synchronizing signal outputted from the timing generator 12. The coded data quantity monitoring circuit 9 detects the quantity of data of the image signal at timing indicated by arrows in FIG. 5. That is, the coded data quantity monitoring circuit 9 detects the quantity of data of the image signal at timing immediately before the frame number i is incremented.

Hereinafter, a change in data quantity of image data detected by the coded data quantity monitoring circuit 9 when the digital still camera 1 performs compression processing of the image signal plural times in the continuous image pickup compression control mode will be described using a specific example.

Figure 6:
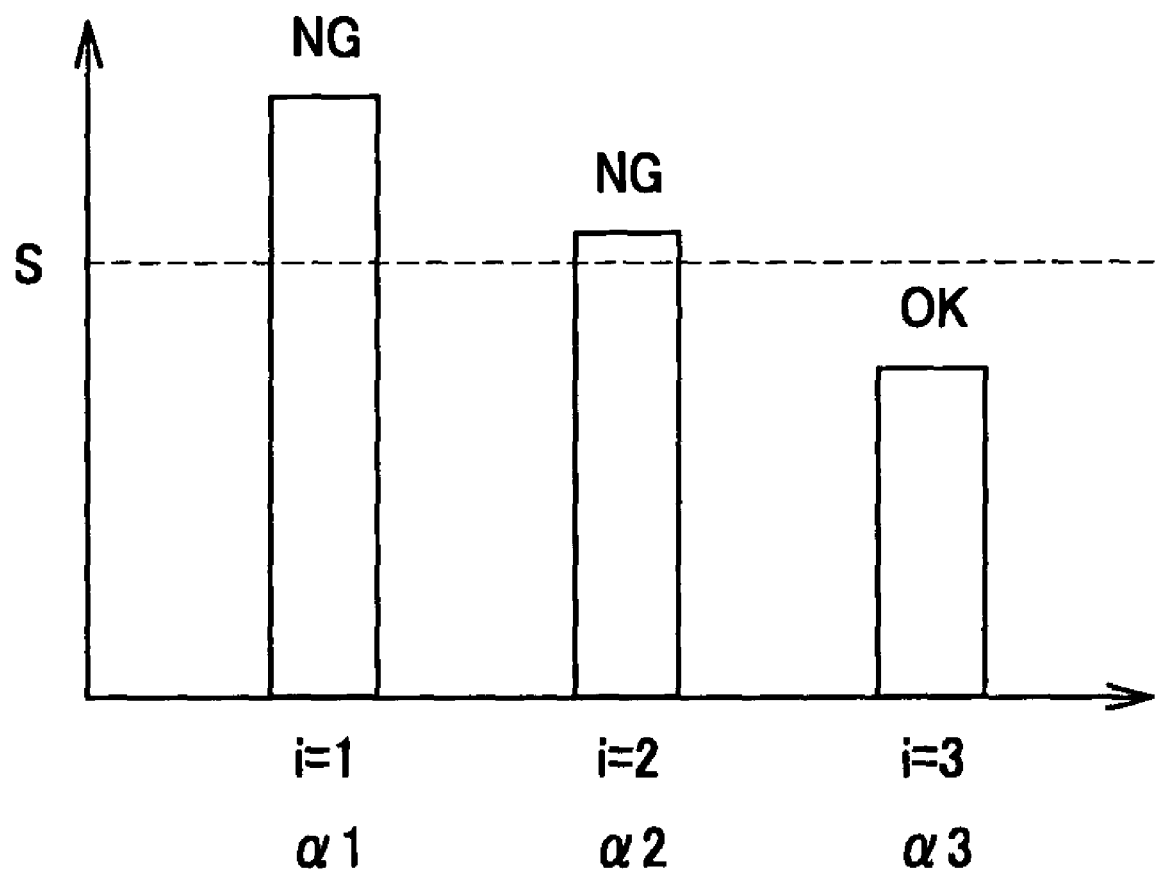
FIG. 6 shows a change in quantity of an image signal outputted from a JPEG circuit 7 when image pickup ends after setting the number of continuously picked-up images N at 4 and performing compression processing to an image signal three times in the digital still camera.

Using an example in which the number of continuously picked-up images N is set at 4 and image pickup ends after compression processing of the image signal is performed three times, a change in data quantity of the image signal detected by the coded data quantity monitoring circuit 9 will be described with reference to FIG. 6. In FIG. 6, the horizontal axis represents the frame number i and the vertical axis represents the data quantity after coding.

When the frame number i is 1, that is, when compression processing is performed to the image signal for the first time, the quantity of data of the image signal detected by the coded data quantity monitoring circuit 9 is equal to or more than the maximum coded data quantity S, as shown in FIG. 6.

Therefore, at step ST14, it is judged that the frame number i is less than the number of continuously picked-up images N and the quantity of data of the image signal detected by the coded data quantity monitoring circuit 9 is more than the maximum coded data quantity S. Thus, the processing goes to step ST15.

Next, at step ST15, the frame number i is incremented to i=2. The quantization table $\alpha i$ to be used in the quantization circuit 21 is changed and a quantization table $\alpha 2$ is selected. As the quantization table $\alpha 2$, a quantization table that, when used in the quantization circuit 21 for quantization, realizes a higher compression rate than when a quantization table $\alpha 1$ is used for quantization, is selected.

The processing then goes back to step ST3. The image pickup element 3 is caused to pick up an image of the object again and compression processing is performed again to the image signal.

When the frame number i is 2, that is, when the image signal is compressed for the second time, the quantity of data of the image signal detected by the coded data quantity monitoring circuit 9 is less than when the frame number i is 1, but it is still equal to or more than the maximum coded data quantity S, as shown in FIG. 6.

Therefore, at step ST14, it is judged that the frame number i is less than the number of continuously picked-up images N and the quantity of data of the image signal detected by the coded data quantity monitoring circuit 9 is more than the maximum coded data quantity S. Thus, the processing goes to step ST15.

Next, at step ST15, the frame number i is incremented to i=3. The quantization table $\alpha i$ to be used in the quantization circuit 21 is changed and a quantization table $\alpha 3$ is selected. As the quantization table $\alpha 3$, a quantization table that, when used in the quantization circuit 21 for quantization, realizes a higher compression rate than when the quantization table $\alpha 2$ is used for quantization, is selected.

The processing then goes back to step ST3. The image pickup element 3 is caused to pick up an image of the object again and compression processing is performed again to the image signal.

When the frame number i is 3, that is, when the image signal is compressed for the third time, the quantity of data of the image signal detected by the coded data quantity monitoring circuit 9 is less than the maximum coded data quantity S, as shown in FIG. 6.

Therefore, at step ST14, it is judged that the quantity of data of the image signal detected by the coded data quantity monitoring circuit 9 is less than the maximum coded data quantity S, and the image pickup ends.

As described above, in the digital still camera 1 to which the present invention is applied, the coded data quantity monitoring circuit 9 detects the quantity of data of the image signal compressed by the JPEG compression circuit 7. Then, when the CPU 10 judges that the quantity of data detected by the coded data quantity monitoring circuit 9 is equal to or more than the maximum coded data quantity S, first, the image pickup element 3 is caused to pick up an image of the object again and output a different image signal, and the quantization table $\alpha i$ to be used in the quantization circuit 21 is changed. When the quantization table $\alpha i$ is changed, a quantization table that realized a higher compression rate is selected. Next, compression processing is performed again as the different image data is DCT-transformed by the DCT circuit 20, then quantized by the quantization circuit 21 and coded by the coding circuit 22. Then, the compressed difference image signal is recorded to the memory card 13. When recording the different image signal to the memory card 13, the image signal is to be recorded into the area where the previous image signal has been recorded in advance.

Therefore, in the digital still camera 1, the compression rate of the image signal can be controlled even when the necessary memory capacity for image processing is minimized. For example, in the digital still camera 1, the compression rate of the image signal can be controlled without loading any excess memory such as a frame memory or preparing an excess recording capacity for the memory card 13.

That is, with the digital still camera 1 according to the present invention, the compression rate can be controlled even when the memory capacity is reduced for cost reduction, and the number of frames of an image that can be recorded to the memory card 13 can be guaranteed.

INDUSTRIAL APPLICABILITY

In the image pickup apparatus according to the present invention, the quantity of data detected by data quantity detection means is compared with a predetermined value, and when the quantity of data is equal to or more than the predetermined value, the image pickup means picks up an image of an object again and outputs a different image signal based on the object. The different image signal is quantized by the quantization means using a different quantization table, then coded by the coding means, and then recorded to a recording medium by the signal recording means. Therefore, the compression rate of the image signal can be controlled even when the necessary memory capacity for processing the image signal is minimized.

With the image pickup apparatus according to the present invention, the compression rate can be controlled even when the memory capacity is reduced for cost reduction, and the number of frames of an image that can be recorded to a recording medium can be guaranteed.

The invention claimed is:

1. An image pickup apparatus comprising:
   image pickup means for converting an object image to an image signal and outputting the image signal;
   orthogonal transform means for orthogonally transforming the image signal;
   plural quantization tables having different quantization characteristic values;
   quantization means for quantizing the orthogonally transformed image signal using the quantization tables;
   coding means for variable-length coding the quantized image signal;
   recording means for recording the variable-length-coded image signal to an external recording medium external of said image pickup apparatus;
   data quantity detection means for detecting the quantity of data of the variable-length-coded image signal;
   mode selecting means selecting a first mode for outputting one frame of the image signal from the image pickup means and selecting a second mode for outputting plural frames of the image signal from the image pickup means; and
   output control means operable in the second mode to judge if the detected quantity of data of the image data is equal to or more than a predetermined value, so as to cause the image pickup means to output a succeeding entire frame of the image signal from the image pickup means, and to cause the quantization means to quantize said succeeding entire frame of the orthogonally transformed image signal using a different quantization table.

2. The image pickup apparatus of claim 1, wherein the recording control means is operable in the second mode to record the m-th frame of the variable-length-coded image signal (m being an integer equal to or more than 2) to the same area on the external recording medium where the (m-1)th frame of the variable-length-coded image signal is recorded.

3. The image pickup apparatus as claimed in claim 1, wherein the external recording medium is attachable/removable.

4. An image pickup method performed by image pickup apparatus and comprising the steps of:
   orthogonally transforming an image signal outputted by an image pickup element;
   quantizing the orthogonally transformed image signal using a quantization table;
   variable-length coding the quantized image signal;
   recording the variable-length-coded image signal to an external recording medium external of said image pickup apparatus;
   detecting the quantity of data of the variable-length-coded image signal; and
   causing the image pickup element to output a succeeding entire frame of the image signal if the detected quantity of data of the variable-length-coded image signal is equal to or more than a predetermined value and to quantize the image signal using a different quantization table when a succeeding entire frame of the image signal is outputted.

5. The image pickup method of claim 4, wherein the m-th frame of the variable-length-coded image signal is recorded into the same area on the external recording medium where the (m-1)th frame of the variable-length-coded image signal is recorded.

* * * * *